United States Patent Office 3,287,216
Patented Nov. 22, 1966

3,287,216
HYPOTENSIVE DIURETIC ALUDRINOCHROME ISONICOTINIC ACID HYDRAZONE SOLUTIONS
Norman Barsel, Laurelton, N.Y., assignor to Chem Research Company, Laurelton, N.Y., a partnership
No Drawing. Filed Aug. 2, 1961, Ser. No. 128,683
4 Claims. (Cl. 167—65)

This application is a continuation-in-part application of my copending application Serial No. 29,178, filed March 16, 1960 now abandoned.

The present invention relates to the isonicotinic acid hydrazone of aludrinochrome in the form of water soluble complexes thereof with non-toxic water soluble salts of salicylic acid or non-toxic water soluble salts of 3-hydroxy-2-naphthoic acid.

In my U.S. Patent No. 2,728,772 there is disclosed the isonicotinic acid hydrazone of adrenochrome. As pointed out in this patent this compound is a valuable haemostat and especially when used in combination with non-toxic water soluble salts of 3-hydroxy-2-naphthoic acid as set forth in U.S. Patent No. 2,791,532.

In accordance with the present invention there has been prepared by reaction of isoniazide (isonicotinic acid hydrazide) and an in situ prepared aludrinochrome a new valuable diuretic compound effective under normal blood pressure conditions and under hypertensive conditions to reduce the blood pressure, this compound being the isonicotinic acid hydrazone of aludrinochrome of the following formula:

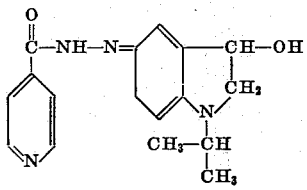

The above novel compound is prepared by a process illustrated by the following equation:

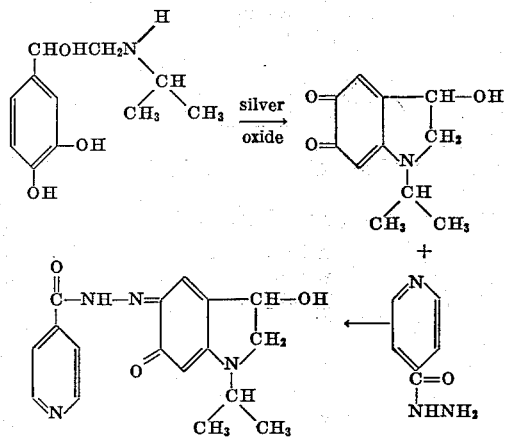

In practicing the process above set forth 50 grams of isopropylarterenol hydrochloride U.S.P. is dissolved in an alcoholic solvent such as methanol. Silver oxide is then added and the mixture stirred for several minutes at room temperature. The reaction mixture is then filtered to remove silver and form a solution of aludrinochrome. To this solution there is then added isoniazide in water and the reacted solution is then slowly distilled under a vacuum to half its volume. Upon cooling for several hours a precipitate of the isonicotinic acid hydrazone of aludrinochrome settles out.

The isonicotinic acid hydrazone of aludrinochrome is solubilized with a soluble non-toxic salt of 3-hydroxy-2-naphthoic acid such as the sodium, potassium or ammonium salts. Of these salts the sodium salt is preferred. For this purpose preferably the non-toxic water soluble salts of 3-hydroxy-2-naphthoic acid should be present in an amount approximately 1½ times the amount of the hydrazone. Such solutions containing a quantity of the naphthoic acid salt equal to 1½ times by weight of the hydrazone derivative will dissolve up to 50 mg. per cc. of the hydrazone derivative.

Similarly non-toxic water soluble salts such as sodium, potassium or ammonium of salicylic acid will also form water soluble combinations with the isonicotinic acid hydrazone of aludrinochrome. In this instance there should be present at least 5 parts by weight of the salicylate salt to each 1 part by weight of the isonicotinic acid hydrazone of aludrinochrome. A water solution of the salicylate salts will dissolve up to 25 mg. per cc. of the isonicotinic acid hydrazone of aludrinochrome.

In preparing the novel water soluble combinations of the isonicotinic acid hydrazone of aludrinochrome with water-soluble non-toxic salts of 3-hydroxy-2-naphthoic acid of salicylic acid, a solution of the soluble salts is first prepared. These solutions will preferably contain for example about 12.5 mg. per cc. of the salicylate salts or 7.5 mg. per cc. of the naphthoate salt. These solutions will then be used to dissolve up to 25 mg. per cc. of the isonicotinic acid hydrazone of aludrinochrome in the case of the salicylate salt and up to 50 mg. per cc. in the case of the naphthoate salt. These will therefore be present in effective therapeutic solutions or in dry combinations derived therefrom approximately at least 5 parts by weight of the salt of salicylic acid or 1.5 parts by weight of the salt of 3-hydroxy-2-naphthoic acid to each part of the aludrinochrome derivative. The solution may be made at room temperature or with slight heating. The solutions may be diluted with water to any degree without precipitation or in the alternative more dilute solutions of the aforementioned soluble salts may be used for dissolving lesser quantities of the aludrinochrome derivatives. If more dilute solutions are used however than those preferred a greater proportion of the soluble salt is preferably used as compared to the aludrinochrome derivative. Preferably the solutions should contain at least 1% by weight of the soluble salicylate salt and at least 0.2% by weight of the soluble salt of 3-hydroxy-2-naphthoic acid. The solution may also have added thereto material commonly used in injectible compositions such as up to 2% benzyl alcohol which serve to reduce pain at the injection site.

After the solutions have been made of the adrenochrome derivative and the aforementioned salts, they may be evaporated to dryness as by vacuum distillation at temperatures below 50°–60° C., or preferably, by lyophilizing, i.e. rapid freezing and dehydration in the frozen state under a high vacuum. Still another method found suitable for dehydration and the solutions is rapid spray drying and for this purpose the solutions may be contacted in a conventional spray dryer with hot air at a temperature of approximately 400° F. The resultant powder is thereafter quickly removed from the spray drying chamber which may have a temperature of 200° F.

The solution may be used as such for injection in the form of aqueous solutions containing for each cc. of solution more than 1 mg. of the isonicotinic acid hydrazone of aludrinochrome. The dry material may be used in the form of tablets, being formed into a tablet with the usual excipients, fillers and/or binders. In any event, useable solutions will contain at least 5 parts by weight of the non-toxic water soluble salts of salicylic acid or at least 1.5 parts by weight of the non-toxic water soluble salts of 3-hydroxy-2-naphthoic acid for each part by weight of the isonicotinic acid hydrazone of aludrinochrome.

The following specific examples serve to illustrate but are not intended to limit the present invention.

EXAMPLE I 50 grams of isopropylarterenol hydrochloride U.S.P. are dissolved in 4 liters of methanol. 100 grams of silver oxide are added to the solution and the mixture is stirred for 15 minutes. This is then filtered through a filter aid and sodium sulfate. To the filtered solution of aludrinochrome thus prepared, 50 grams of isoniazide U.S.P. in 600 cc. of water are added. The solution is then candled through an .02 candle. This solution is slowly distilled under reduced pressure at no higher a temperature than 60° C., outside temperature, in a water bath until a viscous liquid begins to appear. The solution is then cooled for several hours until precipitation is complete. The precipitate is filtered and set to dry and washed with small quantities of methanol and water and dried. The melting point of the isonicotinic acid hydrazone of aludrinochrome is between 104 and 107° C.

EXAMPLE II

To 100 cc. of distilled water there were added 7.5 grams of the sodium salt of 3-hydroxy-2-naphthoic acid. The solution was heated and stirred. To the solution there were then added 5 grams of the isonicotinic acid hydrazone of Example I. After stirring for about 30 minutes a clear solution resulted containing 50 mg. of aludrinochrome isonicotinic acid hydrazone per cc. The solution was then sterilized and filled into sterile ampules under aseptic conditions. The solution was stable and could be injected in doses of 5 to 40 mg. of the aludrinochrome isonicotinic acid hydrazone intermuscularly without producing any undesirable side reactions. The composition was effective as an inhibitor of hyalouronidase and for control of small capillary type bleeding. It was also an effective diuretic and lowers blood pressure.

EXAMPLE III

To 100 cc. of distilled water there were added 12.5 grams sodium salt of salicylic acid. The solution was heated and stirred. To the solution there were then added 2.5 grams of the isonicotinic acid hydrazone of aludrinochrome of Example I. After stirring for about 30 minutes a clear solution resulted containing 25 mg. of aludrinochrome isonicotinic acid hydrazone per cc. The solution was then sterilized and filled into sterile ampules under aseptic conditions. The solution was stable and could be injected in doses of 5 to 20 mg. of the aludrinochrome isonicotinic acid hydrazone intermuscularly without producing any undesirable side reactions. The composition was effective as a diuretic, lowers blood pressure and is useful as an inhibitor of hyalouronidase and for control of small capillary type bleeding.

EXAMPLE IV

Each of the solutions of Examples II and III were quick frozen at a temperature of −10° C. The water content was then driven off at a pressure of 100 microns of mercury and a temperature of −20° C., to form a dry product. The dry products were then formed into tablets by adding thereto the usual excipients and fillers such as milk sugar, starch, etc., so that each tablet contained approximately 5 mg. of the aludrinochrome derivative. The tablets proved effective for the control of capillary bleeding, as a hypotensive agent and as a diuretic. As for example, a normal dose of from 2 to 10 tablets daily was sufficient to control various types of capillary bleeding. A somewhat higher dosage, of the order of 15 to 20 tablets daily, gave a substantial increase in urine excretion and lowers blood pressure.

I claim:

1. A hypotensive diuretic composition comprising an aqueous solution of at least 1.5 parts by weight of a non-toxic, water soluble salt of 3-hydroxy-2-naphthoic acid and one part by weight of the isonicotinic acid hydrazone of aludrinochrome, said part of naphthoic acid related to said part of said hydrazone, said solution containing at least 1 mg. per cc. of the aludrinochrome derivative.

2. A hypotensive diuretic composition comprising an aqueous solution of at least 1.5 parts by weight of the sodium salt of 3-hydroxy-2-naphthoic acid and one part by weight of the isonicotinic acid hydrazone of aludrinochrome, said part of naphthoic acid related to said part of said hydrazone, said solution containing at least 1 mg. per cc. of the aludrinochrome derivative.

3. A hypotensive diuretic composition comprising an aqueous solution of at least five parts by weight of a non-toxic, water soluble salt of salicylic acid and one part by weight of the isonicotinic acid hydrazone of aludrinochrome, said part of salicylic acid related to said part of said hydrazone, said solution containing at least 1 mg. per cc. of the aludrinochrome derivative.

4. A hypotensive diuretic composition comprising an aqueous solution of at least five parts by weight of the sodium salt of salicylic acid and one part by weight of the isonicotinic acid hydrazone of aludrinochrome, said part of salicylic acid related to said part of said hydrazone, said solution containing at least 1 mg. per cc. of the aludrinochrome derivative.

References Cited by the Examiner

UNITED STATES PATENTS 2,728,772  12/1955  Barsel _____ 260—295
2,791,532   5/1957  Fleischhacker et al. ____ 167—65

OTHER REFERENCES

New and Nonofficial Remedies, 1956, page 248, "Carbazochrome Salicylate."

Chemical Abstracts, vol. 46, col. 5011 (1952).

SAM ROSEN, *Primary Examiner.*

MORRIS O. WOLK, LEWIS GOTTS, JULIAN S. LEVITT, FRANK CACCIAPAGLIA, JR., *Examiners.*

E. FRANK, *Assistant Examiner.*